United States Patent
Russell

(10) Patent No.: US 12,399,403 B2
(45) Date of Patent: Aug. 26, 2025

(54) OPTICAL DEVICES AND HEAD-MOUNTED DISPLAYS EMPLOYING TUNABLE CYLINDRICAL LENSES

(71) Applicant: Magic Leap, Inc., Plantation, FL (US)

(72) Inventor: Andrew Ian Russell, Weston, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/281,896

(22) PCT Filed: Mar. 14, 2022

(86) PCT No.: PCT/US2022/020181
§ 371 (c)(1),
(2) Date: Sep. 13, 2023

(87) PCT Pub. No.: WO2022/197603
PCT Pub. Date: Sep. 22, 2022

(65) Prior Publication Data
US 2024/0168342 A1 May 23, 2024

Related U.S. Application Data
(60) Provisional application No. 63/161,298, filed on Mar. 15, 2021.

(51) Int. Cl.
G02F 1/1343 (2006.01)
G02B 27/00 (2006.01)
(Continued)

(52) U.S. Cl.
CPC ... G02F 1/134363 (2013.01); G02B 27/0093 (2013.01); G02B 27/0172 (2013.01);
(Continued)

(58) Field of Classification Search
CPC . G02B 27/0172; G02C 7/083; G02F 1/13471; G02F 1/134363; G02F 1/294; G02F 1/134309; G02F 1/134372
See application file for complete search history.

(56) References Cited

U.S. PATENT DOCUMENTS 5,371,629 A 12/1994 Kurtin et al.
5,424,793 A 6/1995 Fukushima et al.
(Continued)

FOREIGN PATENT DOCUMENTS

EP 2074465 6/2013
EP 2649485 10/2013
(Continued)

OTHER PUBLICATIONS

Azuma, "A Survey of Augmented Reality," Presence: Teleoperators and Virtual Environments, Aug. 1997, 6(4):355-385.
(Continued)

Primary Examiner — Paisley L Wilson
(74) Attorney, Agent, or Firm — Fish & Richardson P.C.

(57) ABSTRACT

This disclosure describes in-plane switching mode liquid crystal geometric phase tunable lenses that can be integrated into an eyepiece of an optical device for the correction of non-emmetropic vision, such as in an augmented reality display system. The eyepiece can include an integrated, field-configurable optic arranged with respect to a waveguide used to project digital imagery to the user, the optic being capable of providing a tunable Rx for the user including variable spherical refractive power (SPH), cylinder refractive power, and cylinder axis values. In certain configuration, each tunable eyepiece includes two variable compound lenses: one on the user-side of the waveguide
(Continued)

with variable SPH, cylinder power, and axis values; and a second on the world side of the waveguide with variable SPH.

23 Claims, 9 Drawing Sheets

(51) Int. Cl.
  *G02B 27/01* (2006.01)
  *G02C 7/08* (2006.01)
  *G02F 1/1347* (2006.01)
  *G02F 1/29* (2006.01)
(52) U.S. Cl.
  CPC ....... *G02C 7/083* (2013.01); *G02F 1/134336* (2013.01); *G02F 1/13471* (2013.01); *G02F 1/294* (2021.01)

(56) References Cited

U.S. PATENT DOCUMENTS

| | | |
|---|---|---|
| 6,832,477 B2 | 12/2004 | Gummin et al. |
| 6,850,221 B1 | 2/2005 | Tickle |
| D514,570 S | 2/2006 | Ohta |
| 7,039,309 B2 | 5/2006 | Hsiao |
| 7,758,185 B2 | 7/2010 | Lewis |
| 8,087,778 B2 | 1/2012 | Gupta et al. |
| 8,353,594 B2 | 1/2013 | Lewis |
| 8,696,113 B2 | 4/2014 | Lewis |
| 8,733,927 B1 | 5/2014 | Lewis |
| 8,733,928 B1 | 5/2014 | Lewis |
| 9,010,929 B2 | 4/2015 | Lewis |
| 9,081,426 B2 | 7/2015 | Armstrong |
| 9,215,293 B2 | 12/2015 | Miller |
| 9,235,064 B2 | 1/2016 | Lewis |
| 9,239,473 B2 | 1/2016 | Lewis |
| 9,244,293 B2 | 1/2016 | Lewis |
| D752,529 S | 3/2016 | Loretan et al. |
| 9,348,143 B2 | 5/2016 | Gao et al. |
| D759,657 S | 6/2016 | Kujawski et al. |
| 9,417,452 B2 | 8/2016 | Schowengerdt et al. |
| 9,470,906 B2 | 10/2016 | Kaji et al. |
| 9,547,174 B2 | 1/2017 | Gao et al. |
| 9,658,473 B2 | 5/2017 | Lewis |
| 9,671,566 B2 | 6/2017 | Abovitz et al. |
| D794,288 S | 8/2017 | Beers et al. |
| 9,740,006 B2 | 8/2017 | Gao |
| 9,791,700 B2 | 10/2017 | Schowengerdt |
| D805,734 S | 12/2017 | Fisher et al. |
| 9,851,563 B2 | 12/2017 | Gao et al. |
| 9,857,591 B2 | 1/2018 | Welch et al. |
| 10,151,937 B2 | 12/2018 | Lewis |
| 10,185,147 B2 | 1/2019 | Lewis |
| 10,262,462 B2 | 4/2019 | Miller et al. |
| 10,459,231 B2 | 10/2019 | Miller et al. |
| 10,670,808 B1 | 6/2020 | Trail |
| 10,877,277 B1* | 12/2020 | Lu .............. G02B 6/0056 |
| 11,249,309 B2 | 2/2022 | Schaefer et al. |
| 11,762,130 B1 | 9/2023 | Smyth et al. |
| 2004/0141735 A1 | 7/2004 | Nomura |
| 2006/0028436 A1 | 2/2006 | Armstrong |
| 2006/0119218 A1 | 6/2006 | Doshida et al. |
| 2007/0018919 A1 | 1/2007 | Zavracky et al. |
| 2007/0081123 A1 | 4/2007 | Lewis |
| 2008/0144186 A1 | 6/2008 | Feng et al. |
| 2009/0251798 A1 | 10/2009 | Huang et al. |
| 2012/0127062 A1 | 5/2012 | Bar-Zeev et al. |
| 2012/0162549 A1 | 6/2012 | Gao et al. |
| 2012/0162581 A1 | 6/2012 | Ashida et al. |
| 2013/0050432 A1 | 2/2013 | Perez et al. |
| 2013/0082922 A1 | 4/2013 | Miller |
| 2013/0117377 A1 | 5/2013 | Miller |
| 2013/0125027 A1 | 5/2013 | Abovitz |
| 2013/0141434 A1 | 6/2013 | Sugden et al. |
| 2013/0176628 A1 | 7/2013 | Batchko et al. |
| 2013/0208234 A1 | 8/2013 | Lewis |
| 2013/0242262 A1 | 9/2013 | Lewis |
| 2014/0071539 A1 | 3/2014 | Gao |
| 2014/0168035 A1 | 6/2014 | Luebke et al. |
| 2014/0177023 A1 | 6/2014 | Gao et al. |
| 2014/0218468 A1 | 8/2014 | Gao et al. |
| 2014/0267420 A1 | 9/2014 | Schowengerdt |
| 2014/0306866 A1 | 10/2014 | Miller et al. |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0185487 A1* | 7/2015 | Lee .............. G02B 30/28 |
| | | 349/15 |
| 2015/0205126 A1 | 7/2015 | Schowengerdt |
| 2015/0222883 A1 | 8/2015 | Welch |
| 2015/0222884 A1 | 8/2015 | Cheng |
| 2015/0248046 A1 | 9/2015 | Schowengerdt |
| 2015/0268415 A1 | 9/2015 | Schowengerdt et al. |
| 2015/0301356 A1 | 10/2015 | Tabirian et al. |
| 2015/0302652 A1 | 10/2015 | Miller et al. |
| 2015/0309263 A2 | 10/2015 | Abovitz et al. |
| 2015/0326570 A1 | 11/2015 | Publicover et al. |
| 2015/0346490 A1 | 12/2015 | TeKolste et al. |
| 2015/0346495 A1 | 12/2015 | Welch et al. |
| 2016/0004102 A1 | 1/2016 | Nisper et al. |
| 2016/0011419 A1 | 1/2016 | Gao |
| 2016/0026253 A1 | 1/2016 | Bradski et al. |
| 2016/0047956 A1 | 2/2016 | Tabirian et al. |
| 2016/0109730 A1 | 4/2016 | McDowall et al. |
| 2016/0209560 A1 | 7/2016 | Tabirian et al. |
| 2017/0000326 A1 | 1/2017 | Samec et al. |
| 2017/0010469 A1 | 1/2017 | Samec et al. |
| 2017/0045742 A1 | 2/2017 | Greenhalgh et al. |
| 2017/0045760 A1 | 2/2017 | Tabirian et al. |
| 2017/0168307 A1 | 6/2017 | Itani |
| 2017/0223344 A1 | 8/2017 | Kaehler |
| 2018/0017757 A1 | 1/2018 | Bohn |
| 2018/0088381 A1 | 3/2018 | Lin et al. |
| 2018/0129048 A1 | 5/2018 | Robbins et al. |
| 2018/0143473 A1 | 5/2018 | Yamazaki et al. |
| 2018/0196318 A1* | 7/2018 | Presniakov ....... G02F 1/134363 |
| 2018/0314066 A1 | 11/2018 | Bell et al. |
| 2018/0356639 A1 | 12/2018 | Schaefer et al. |
| 2019/0171026 A1 | 6/2019 | Parsons |
| 2020/0051320 A1 | 2/2020 | Laffont et al. |
| 2020/0058256 A1 | 2/2020 | Seibert et al. |
| 2020/0069174 A1 | 3/2020 | Marin et al. |
| 2020/0073143 A1 | 3/2020 | Macnamara et al. |
| 2020/0174284 A1 | 6/2020 | Chan et al. |
| 2020/0371360 A1 | 11/2020 | Dalrymple et al. |
| 2021/0041711 A1 | 2/2021 | Sharp et al. |
| 2021/0141212 A1 | 5/2021 | Jacoby et al. |
| 2022/0137418 A1 | 5/2022 | Schaefer et al. |
| 2022/0221710 A1 | 7/2022 | Dalrymple et al. |
| 2023/0194897 A1* | 6/2023 | Van Heugten ......... G02B 26/00 |
| | | 351/159.39 |
| 2023/0266592 A1 | 8/2023 | Russell et al. |

FOREIGN PATENT DOCUMENTS

| | | |
|---|---|---|
| EP | 3914959 | 12/2021 |
| JP | S 60-010224 | 1/1985 |
| JP | H02-110511 | 4/1990 |
| JP | H03-006518 | 1/1991 |
| JP | 2006003872 A | 1/2006 |
| JP | 2007505353 A | 3/2007 |
| JP | 2007-240709 | 9/2007 |
| JP | 2011141316 A | 7/2011 |
| JP | 2012-505430 | 3/2012 |
| JP | 2015513121 A | 4/2015 |
| JP | 2016510430 A | 4/2016 |
| JP | 2016519327 A | 6/2016 |
| JP | 2016173570 A | 9/2016 |
| JP | 2016177232 A | 10/2016 |
| KR | 10-2016-0091402 | 8/2016 |
| WO | 2005093493 A1 | 10/2005 |
| WO | WO 2012/078410 | 6/2012 |
| WO | WO 2015/081313 | 6/2015 |

(56) References Cited

FOREIGN PATENT DOCUMENTS

| WO | WO 2016/181108 | 11/2016 |
| WO | 2018028847 A1 | 2/2018 |
| WO | WO 2018/158347 | 9/2018 |
| WO | WO 2018/231784 | 12/2018 |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.

Bimber et al., "Spatial Augmented Reality Merging Real and Virtual Worlds," A K Peters, Ltd. (ed.), 2005, 393 pages.

Chen et al., "Electrically adjustable location of a projected image in augmented reality via a liquid-crystal lens," Optics Express, Oct. 2015, 23(22): 9 pages.

Extended European Search Report in European Appln. No. 20738194, dated Feb. 7, 2022, 10 pages.

hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documentation/hardware.htm>, retrieved on Mar. 3, 2021, URL <http://www.hitl.washington.edu/artoolkit/documentation/hardware.htm>, 3 pages.

International Preliminary Report on Patentability in International Appln. No. PCT/US2018/37039, dated Dec. 17, 2019, 8 pages.

International Search Report and Written Opinion in International Appln. No. PCT/US2018/37039, dated Oct. 30, 2018, 16 pages.

International Search Report and Written Opinion in International Appln. No. PCT/US2021/045110, mailed Nov. 3, 2021, 9 pages.

International Search Report and Written Opinion in International Appln. No. PCT/US2022/020181, dated Jun. 29, 2022, 13 pages.

Invitation to Pay Additional Fees in International Appln. No. PCT/US2018/37039, dated Aug. 27, 2018, 3 pages.

Jacob, "Eye Tracking in Advanced Interface Design," Virtual environments and advanced interface design, 1995, 258:288, 50 pages.

Notice of Allowance in Japanese Appln. No. 2019-568041, dated Apr. 17, 2023, 5 pages (with English translation).

Office Action in Indian Appln. No. 202047018987, dated Mar. 29, 2022, 5 pages.

Office Action in Japanese Appln. No. 2019-568041, dated Apr. 27, 2022, 12 pages (with English translation).

PCT International Search Report and Written Opinion in International Appln. No. PCT/US2020/034401, dated Aug. 26, 2020, 14 pages.

PCT International Search Report and Written Opinion in International Appln. No. PCT/US2020/034406, dated Sep. 8, 2020, 14 pages.

Tabiryan et al., "Superlens in the skies: liquid-crystal-polymer technology for telescopes," SPIE, Feb. 2016, 2 pages.

Tanriverdi et al., "Interacting with Eye Movements in Virtual Environments, " Proc. of the SIGCHI Conference on Human Factors in Computing Systems, 2000, pp. 265-272.

Office Action in Korean Appln. No. 10-2024-7004747, dated Jun. 18, 2024, 6 pages (with English translation).

Office Action in Japanese Appln. No. 2022-515978, dated Apr. 9, 2024, 7 pages (with English translation).

Barbero et al., "Power-adjustable sphero-cylindrical refractor comprising two lenses," Optical Engineering, Jun. 18, 2013, 52(6):063002, 10 pages.

Extended European Search Report in European Appln. No. 21853337.0, dated Jun. 11, 2024, 8 pages.

Office Action in Japanese Appln. No. 2023-137148, mailed on Oct. 18, 2024, 24 pages (with English translation).

Notice of Allowance in Japanese Appln. No. 2022-118559, mailed on Nov. 8, 2024, 7 pages (with English translation).

* cited by examiner

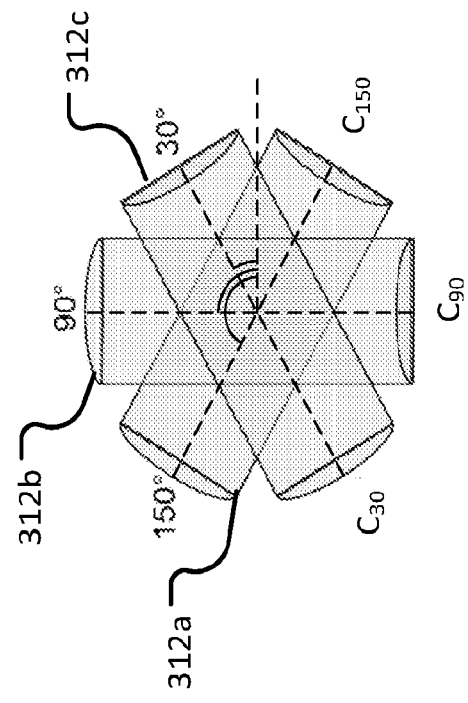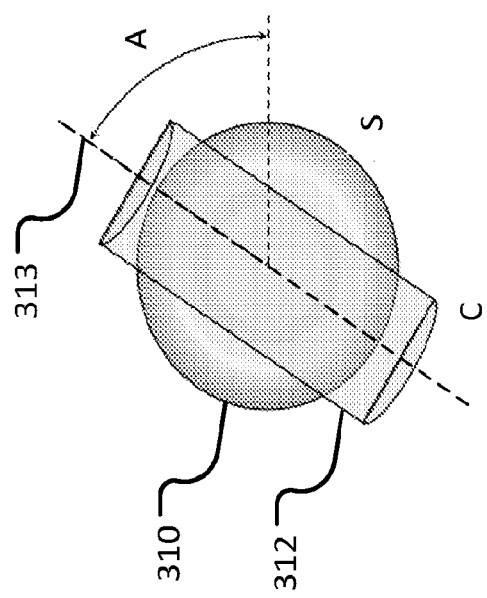
FIG. 3B
FIG. 3A

OPTICAL DEVICES AND HEAD-MOUNTED DISPLAYS EMPLOYING TUNABLE CYLINDRICAL LENSES

PRIORITY CLAIM AND CROSS-REFERENCE TO RELATED APPLICATIONS

This application is a National Stage Application of International Application No. PCT/US2022/020181, filed Mar. 14, 2022, which claims the benefit of U.S. Provisional Application No. 63/161,298 filed on Mar. 15, 2021, which is hereby incorporated by reference in its entirety.

FIELD OF THE DISCLOSURE

The disclosure relates to optical devices that include tunable lenses and, more specifically, to optical devices and head-mounted displays incorporating in-plane switching mode liquid crystal tunable lenses.

BACKGROUND

Wearable display systems for augmented reality can include one or two eyepieces through which a user can view the world and with which the display system can project digital imagery to the user. Eyepieces are often formed using highly refractive materials and are typically designed to account for users with emmetropic vision, i.e., with no refractive error.

For users with non-emmetropic vision, such as short sighted (myopic) or far sighted (hyperopic) users, custom inserts can be provided in the wearable display that correct for a user's refractive error, e.g., according to their ophthalmic prescription (Rx). Alternatively, the display's form factor can be designed to accommodate eyeglasses between the wearer and the display's eyepiece. However, customization of the headset can be both time-consuming and expensive and form factors that accommodate eyeglasses can be unwieldy and aesthetically unappealing.

SUMMARY

This disclosure features in-plane switching (IPS) mode liquid crystal (LC) geometric phase (GP) tunable lenses that can be integrated into an eyepiece of a head-mounted display for the correction of non-emmetropic vision, particularly in a virtual reality, augmented reality, or mixed reality head-mounted display. The eyepiece can include a fully integrated, field-configurable optic arranged with respect to a waveguide used to project digital imagery to the user, the optic being capable of providing a tunable Rx for the user including variable spherical refractive power (SPH), cylinder refractive power (CYL), and cylinder axis (Axis) values. In certain configurations, each tunable eyepiece includes two variable compound lenses: one on the user-side of the waveguide with variable sphere, cylinder, and axis; and a second on the world side of the waveguide with variable sphere. Collectively, the variable compound lenses can correct for refractive error of the user, including astigmatism, and can position digital images at appropriate depth planes relative to the environment and corresponding to the user depth-of-fixation.

In some embodiments, each compound lens is composed of one or more (e.g., two or three) variable cylindrical lenses formed from an IPS-mode LC device. An assembly of two such variable cylindrical lenses whose cylinder axes are oriented at right angles can be used to provide a compound lens with adjustable spherical power. An assembly of three variable cylindrical lenses whose cylinder axes are oriented at 60° intervals can be used to provide a compound lens with adjustable SPH, CYL, and Axis.

In general, in a first aspect, the disclosure features a system that includes a first in-plane switching (IPS) mode liquid crystal (LC) element arranged along an optical axis, a second IPS mode LC element arranged along the optical axis, a third IPS mode LC element arranged along the optical axis, and an electronic controller in communication with the first, second, and third IPS mode LC elements. The electronic controller is configured, during operation, to provide drive signals to the first, second, and third IPS mode LC elements, respectively, so that the first, second, and third elements collectively form an optical element having an overall non-zero spherical refractive power (SPH), non-zero cylinder refractive power (CYL), and cylinder axis (Axis) according to a prescription (Rx).

Implementations of the system can include one or more of the following features and/or features of other aspects. For example, each IPS mode LC element can be a geometric phase (GP) cylindrical lens during operation of the system. Each GP cylindrical lens can have a cylinder axis aligned in a different direction.

Each IPS mode LC element can include a layer of a LC material between two substrates. The LC material can be a nematic phase LC material. Each IPS mode LC element can include an electrode layer supported by one of the two substrates. Each electrode layer can include a two-dimensional array of pixel electrodes. The electronic controller can be programmed to drive the pixel electrodes to uniformly align the LC material along a first direction in a plane of the IPS mode LC element and to vary an alignment of the LC material along a second direction in the plane orthogonal to the first direction. The alignment of the LC material along the second direction can include a plurality of $2\pi$ rotations of a nematic director of the LC material. A spatial wavelength of the $2\pi$ rotations can vary across the IPS mode LC element in the second direction. The spatial wavelength of the $2\pi$ rotations in the second direction can increase from a center of the IPS mode LC element towards the edges of the IPS mode LC element. In some embodiments, the electronic controller is programmed to drive the different subsets of the pixel electrodes at different times and to switch back and forth between the different subsets with a cycle shorter than a relaxation time of the LC material.

An angular separation between the first and second radial directions can be equal to an angular separation between the second and third radial directions.

For a Cartesian coordinate system orthogonal to the optical axis, the first radial direction can be at 30°, the second radial direction can be at 90°, and the third radial direction can be at 150°. The first cylindrical refractive power, $C_{30}$, the second cylindrical refractive power, $C_{90}$, and the third cylindrical refractive power, $C_{150}$, and values for S, C, and A can be related according to the formulae:

$$C_{30} = \frac{2}{3}S + \left(\frac{2}{3}\cos^2 A + \frac{2\sqrt{3}}{3}\cos A \sin A\right)C$$

$$C_{90} = \frac{2}{3}S + \left(\sin^2 A - \frac{1}{3}\cos^2 A\right)C$$

$$C_{150} = \frac{2}{3}S + \left(\frac{2}{3}\cos^2 A - \frac{2\sqrt{3}}{3}\cos A \sin A\right)C$$

The cylindrical refractive power of each of the first, second, and third optical elements can be variable through a range from −5 D to +5 D.

The optical element can have an aperture having an area of 1 cm$^2$ or more (e.g., 5 cm$^2$ or more, 10 cm$^2$ or more, 16 cm$^2$ or more).

Each of the refractive elements can have a thickness along the optical axis of 10 mm or less (e.g., 6 mm or less, 4 mm or less, 3 mm or less, 2 mm or less, 1 mm or less).

In general, in a further aspect, the disclosure features a head-mounted display system, including: a first optical element having a variable spherical refractive power (SPH); a second optical element having a variable SPH, a variable cylinder refractive power (CYL), and a variable cylinder axis (Axis), the second optical element having at least one in-plane switching (IPS) mode liquid crystal (LC) element; a see-through display arranged between the first optical element and the second optical element; and an electronic controller in communication with the first optical element, the second optical element, and the see-through display. The electronic controller is programmed to adjust the SPH of the first optical element and the SPH, CYL, and Axis of the second optical element according to a prescription (Rx) of an individual user of the head-mounted display.

Implementations of the head-mounted display can include one of more of the following features and/or features of other aspects. For example, the head-mounted display can include a frame for mounting the first optical element, second optical element, and see-through display relative to each other and, during use, relative to a user of the head-mounted display. The second optical element can be arranged between the see-through display and the user during use of the head-mounted display.

The first optical element can include two variable cylindrical lenses having their respective cylinder axes orthogonal to each other.

The head-mounted display can include an eye-tracking module, the electronic controller being programmed to vary the prescription of the second optical element based on information about where a user of the head-mounted display is looking from the eye-tracking module. In some embodiments, the electronic controller is programmed to vary the SPH, CYL, and Axis of the second optical element from a near-vision prescription to a distance-vision prescription depending on where the user is looking.

The head-mounted display can include a biometric identification module, the electronic controller being programmed to identify a user based on information from the biometric identification module and adjust a prescription of the second optical element based on the user's identity. The biometric identification module can be an iris identification module.

Among other advantages, the tunable eyepiece can correct for the unique optical prescription, including astigmatism, of a user while minimizing electrical power consumption and electro-mechanical overhead. The tunable eyepiece can alleviate the need to fabricate a custom rigid eyepiece for each user and increase the availability of mixed reality products users with non-emmetropic vision. An included biometric module can identify a user based on their unique iris pattern and adjust the tunable eyepieces to adjust to the prescription of multiple users in the field.

As used herein, a head-mounted display can also be described as a head-mountable display, in that the display is configured to be worn, carried, or otherwise mounted on a head of a user. It is noted that the embodiments described herein are not necessarily limited to situations in which the display is currently mounted on the head of a user.

Other features and advantages of the present application will be apparent from the description, the drawings, and the claims.

BRIEF DESCRIPTION OF THE DRAWINGS

FIG. 3A is a diagram of compound lens used to correct for non-emmetropic vision including a spherical and a cylindrical lens.

FIG. 3B is a diagram of three cylindrical lenses representing an alternative means to correct for non-emmetropic vision.

In the figures, like symbols indicate like elements.

DETAILED DESCRIPTION

Figure 1:
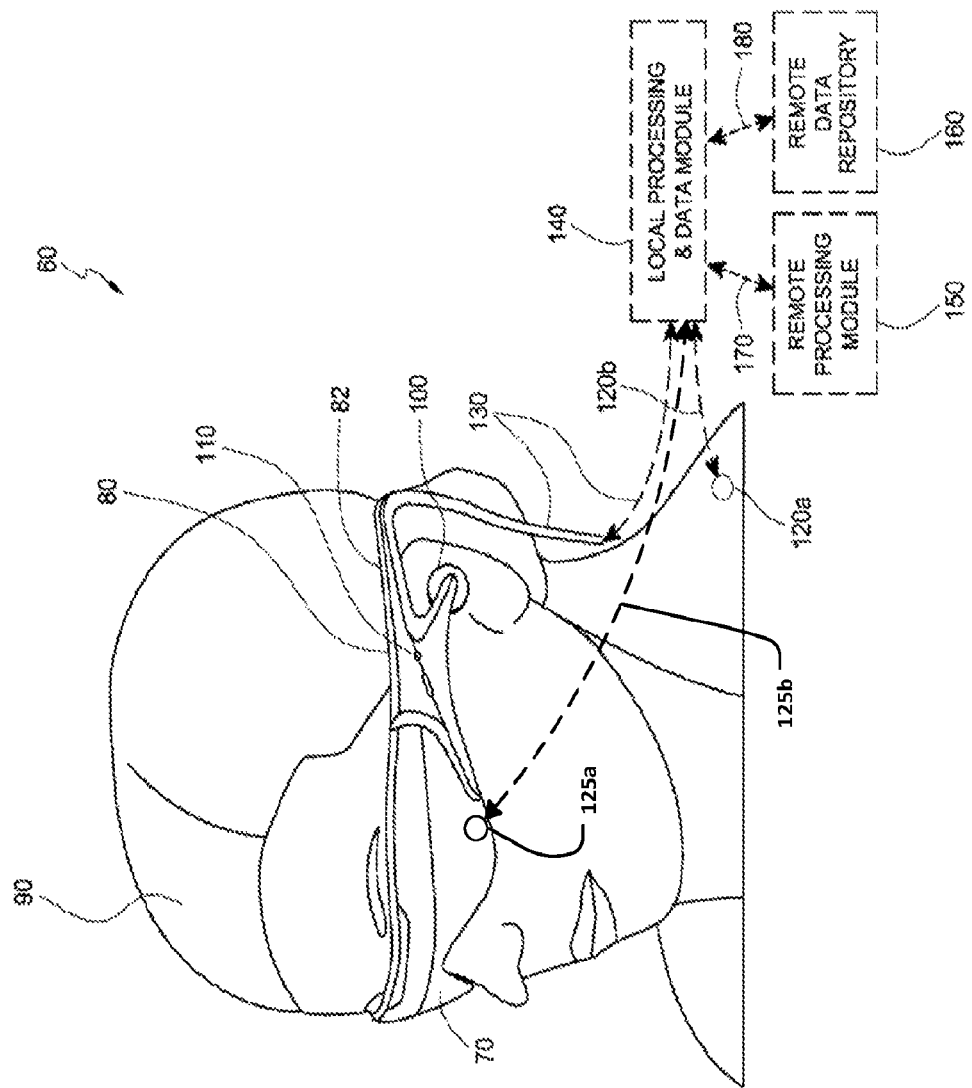
FIG. 1 is a schematic diagram of a wearable headset display.

FIG. 1 illustrates an example head-mounted display system 60 that includes a see-through display 70, and various mechanical and electronic modules and systems to support the functioning of that display 70. The display 70 is housed in a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120a, which may be separate from the frame 80 and attached to the body of the user 90 (e.g., on the head, torso, an extremity, etc.). The peripheral sensor 120a may acquire data characterizing the physiological state of the user 90 in some embodiments.

In some embodiments, the display system may also include an eye-tracking module 125a. In some embodiments, the eye-tracking module 125a can include a biometric identification module to acquire biometric data of the user 90. In some embodiments, the biometric identification module can be an iris identification module.

In some embodiments, the eye-tracking module 120a may acquire depth-of-fixation data. The eye-tracking module 120a may be operatively coupled by communications link 125b (e.g., a wired lead or wireless connectivity) to the local processor and data module 140. The eye-tracking module 120a may communicate the biometric and depth-of-fixation data to the local processor and data module 140.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120a may be operatively coupled by communications link 120b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Variable eyepiece components included with the eyepiece of a display adjust the refractive power of the eyepiece in order to match the depth of the fixation for a user with the user's vision. The refractive power of the variable components can be set at different values across a range of possible values, performing the function of fixed lenses with the added flexibility of controllable correction. The optical prescription (Rx) of a user for correcting refractive error can be loaded into the headset controller and the variable components modified to correct for the unique set of parameters within. The headset can perform this modification for each new user, correcting for each unique Rx in turn.

Figure 2:
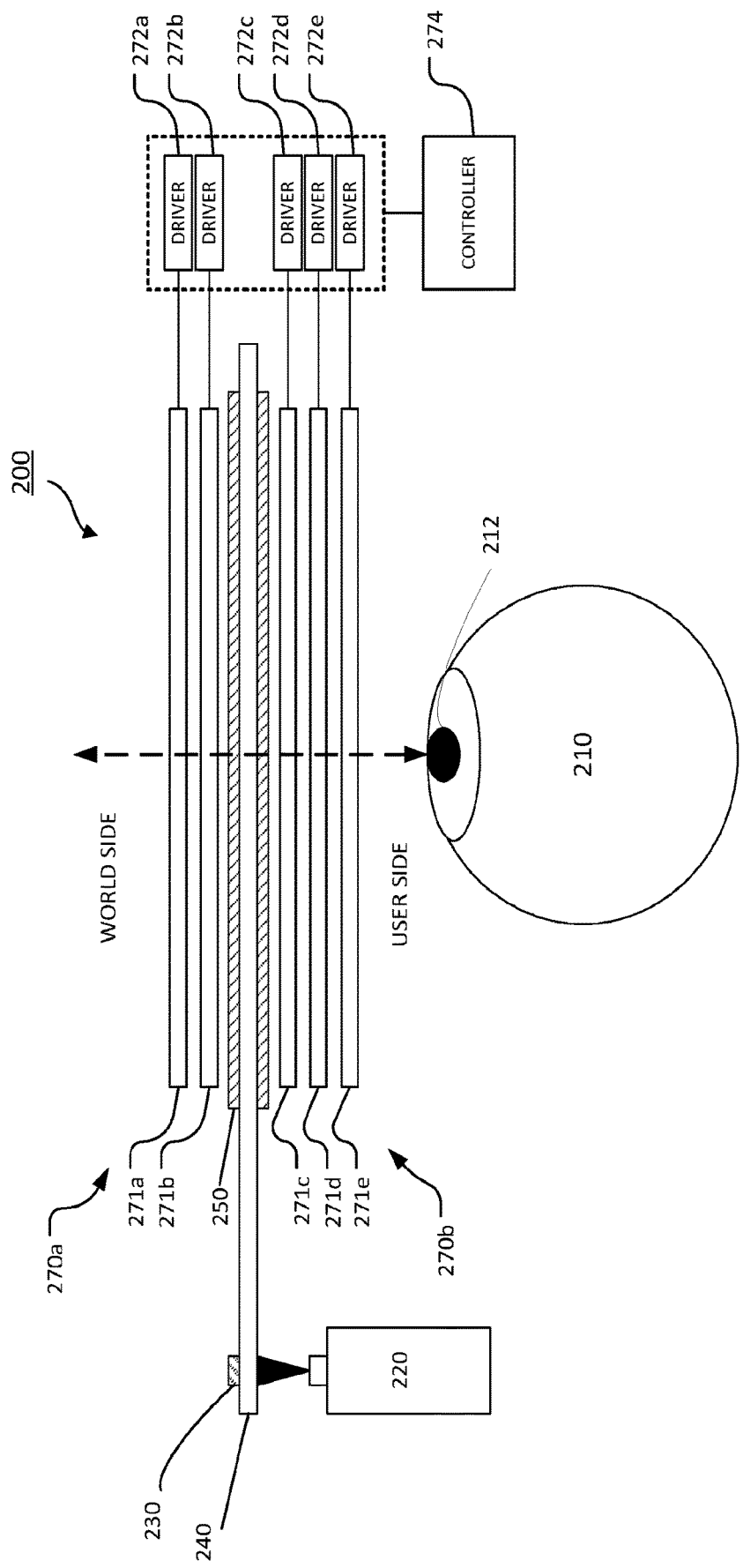
FIG. 2 is a schematic diagram representing the placement of an eye behind an tunable eyepiece with proximal and distal tunable optical elements.

Referring to FIG. 2, an eyepiece 200 of a head-mounted display system directs light from a projector 220 to the eye 210 of a user. The projector 220 and eyepiece 200 are positioned relative to one another and to the eye 210 of the user by a frame or housing (not shown). In this example, the projector 220 is located beside the user's temple and directs light to an end of the eyepiece 200 that extends past the user's temple. As shown, eyepiece 200 includes a planar waveguide 240, an input coupling grating (ICG) 230, and out-coupling element (OCE) 250, however, more complex arrangements (e.g., composed of multiple stacked waveguides) are possible. A first variable focus assembly 270a is located on the world side of waveguide 240 and a second variable focus assembly 270b is located on the user side. Collectively, the refractive powers of variable focus assemblies 270a and 270b are adjusted to concurrently correct the optical properties of the eyepiece to account for the virtual image depth plane and the Rx of a user.

ICG 230 is a surface grating positioned to receive light from projector 220 and facilitates in-coupling of light from projector 220 into the eyepiece 200. The ICG 230 is located at or close to the edge of the eyepiece 200 closest to the projector 220. The ICG 230 directs the light from the projector 220 into guided modes in the planar waveguide substrate 240 of eyepiece 200.

The planar waveguide substrate 240 guide the in-coupled light along the eyepiece 200 through total internal reflection at its surfaces to the out-coupling element (OCE) 250. The OCE 250 is a second surface grating configured to extract the light out of the planar waveguide substrate 240 and redirect it towards the eye 210 of the user. The OCE 250 can include an exit pupil expander (EPE) or an orthogonal pupil expander (OPE) or both. The OCE 250 is located in front of the user's eye 210, delivering light from the projector to the region in which a pupil 212 of the user can be positioned to receive light outputted from the OCE 150. This region is termed the eyebox. The OCE 250 can further have a lateral dimension to accommodate a range of lateral positions of the eyebox. For example, a non-limiting range of the lateral dimension 251 of the OCE 250 can be 30 mm or less (e.g., 25 mm or less, 20 mm or less, 15 mm or less).

Variable focus assembly 270b arranged on the user-facing surface of the eyepiece 200 corrects for the non-emmetropic vision of the user, including for astigmatism. Variable focus assembly 270b additionally places the focus of the eyepiece 200 at the correct depth plane to display virtual images. This placement of the focus also affects the focus of real images passing through the display to the user. The variable focus assembly 270a arranged on the world-facing surface of the eyepiece 200 corrects the real image focus placement resulting from the correction of variable focus assembly 270b. Variable focus assembly 270a includes two optical elements, 271a and 271b, and variable focus assembly 270b includes three optical elements, 271c, 271d, and 271e.

In some embodiments, each optical element 271a-e includes an IPS mode LC element configured as a geometric phase cylindrical lens. A geometric phase (GP) lens, generally, is a lens formed from an optically anisotropic material, like a liquid crystal, which focuses a polarized (e.g., circularly polarized) wavefront by introducing a varying phase shift to the wavefront across an aperture. Such lenses can be formed from a thin film of the anisotropic material, e.g., having substantially constant thickness, rather than having a curved refractive surface like a conventional lens. The IPS mode LC elements are coupled to drivers 272a-e which operate to energize pixels within the LC device, varying an in-plane electric field strength in different regions of the device and thereby locally changing the orientation of the liquid crystal molecules in the device. This effect is described in more detail below. The drivers 272, for example, can vary the optical power of each GP lens, thereby causing the refractive element of the optical element 271 to perform the function of a variable cylindrical lens.

Drivers 272a-e drive pixel electrodes responsive to control signals from the controller 274. In certain implementations, the headset controller 274 performs the calculations to determine the refractive power for each optical element 271a-e. The lens profile of each optical element 271a-e combine to establish the refractive power of the variable focus assembly 270a or 270b. The optical power for the variable focus assemblies can vary based on a variety of considerations, including user Rx, user environment, projected imagery, and/or a combination of these parameters.

In some embodiments, the controller 274 can receive biometric data from an eye-tracking module and adjust the refractive power of variable focus assembly 270b to correct for the Rx of the user based on their biometric identification. In some embodiments, the controller 274 can receive user depth-of-fixation data from the eye-tracking module and adjust the refractive power of variable focus assembly 270b to correct for the near- or distance-vision Rx of a user. Similarly, the controller 274 can receive user depth-of-fixation data from the eye-tracking module and adjust the lens profile of variable optical element 270a to adjust the optical depth of virtual images to match the depth of the fixation for a user.

In general, a person's eye can have refractive errors that lead to conditions such as myopia, hyperopia, astigmatism, or a combination thereof. Using corrective lenses to modify the incoming light rays corrects for these refractive errors. Myopic or hyperopic refractive errors occur when the projected image of an eye is out of focus with the back plane of the eye and are typically corrected through lenses with a 'spherical' profile placed between the eye and incoming light. Broadly, a plano-spherical lens profile can be considered a planar section of the surface of a sphere resulting in a lens profile with two opposing surfaces, a curved surface and a planar surface. The curved surface of a spherical lens is radially symmetric around a central axis oriented orthogonally to the planar surface. A lens with a spherical profile arranged along the optical axis of a user's eye corrects for these refractive errors.

Astigmatism refractive errors are due the eye lens having differential curvatures along different directions. A lens having a 'cylinder' profile can correct this type of error. A plano-cylindrical lens profile can be considered a planar section of a cylinder taken parallel to the longitudinal axis of the cylinder. This results in a lens with opposing curved and planar surfaces (e.g., convex). The longitudinal axis along the center of the planar surface is termed the cylinder axis. The curved surface has an equal radius of curvature along the length of the cylinder profile. A cylindrical lens will generally focus light to a line, rather than a point.

Typically, a lens having a spherical component and a cylinder component are used to correct refractive errors of an astigmatic non-emmetropic eye. An ophthalmic prescription (Rx) combines a spherical component (SPH), a cylindrical component (CYL), and a cylinder axis component (Axis) which are respectively the refractive powers of a spherical and a cylindrical lens, and the orientation of the cylinder axis. A Cartesian coordinate system oriented orthogonally to the optical axis with 0° directed horizontally can be used to define a radial direction of the cylinder axis.

A spherical or cylindrical lens have respective strengths, or refractive powers, typically measured in diopters (D). The refractive power of a lens can be zero, a negative (e.g., divergence), or a positive (e.g., convergence) number. Without wishing to be bound by theory, the refractive power can be equal to the reciprocal of the focal length (f), D=1/f. For example, a lens with a refractive power of +3 D brings parallel rays of light from optical infinity to focus at ⅓ meter. For a further example, a flat or plano lens has a refractive power of 0 D and does not cause light to converge or diverge.

An Rx can be represented by a combination of a spherical lens and a cylindrical lens, as shown in FIG. 3A. Depicted is an exemplary assembly of a spherical lens 310 of refractive power S, and a cylindrical lens 312 of refractive power C. The cylindrical axis 313 of the cylindrical lens 312 is shown oriented at an angle A with respect to a horizontal plane. Without wishing to be bound by theory, the phase profile at a point (x,y) on the surface of any Rx is proportional to $R_x(x,y) \propto S(x^2+y^2)+C(\cos Ax+\sin Ay)^2$ where S the refractive power of the spherical lens, C is the refractive power of the cylindrical lens, and A is the angular orientation of the cylindrical lens.

The correction power of a spherical lens 310 can be alternatively achieved by a pair of cylinder lenses 312 whose cylinder axes are oriented at 900 from each other. Accordingly, the combination of spherical 310 and cylindrical lens 312 shown in FIG. 3A is similarly achievable through the combination of three cylindrical lenses. FIG. 3B depicts the arrangement of three cylindrical lenses 312a, 312b, and 312c with their cylinder axes arranged at radial directions of 30°, 90°, and 150° from the horizontal plane of the eye, with respective refractive powers of $C_{30}$, $C_{90}$, and $C_{150}$. Without wishing to be bound by theory, the refractive powers $C_{30}$, $C_{90}$, and $C_{150}$ necessary to correct for an Rx with spherical and cylindrical components can be determined using $$C_{30} = \frac{2}{3}S + \left(\frac{2}{3}\cos^2 A + \frac{2\sqrt{3}}{3}\cos A \sin A\right)C$$

$$C_{90} = \frac{2}{3}S + \left(\sin^2 A - \frac{1}{3}\cos^2 A\right)C$$

$$C_{150} = \frac{2}{3}S + \left(\frac{2}{3}\cos^2 A - \frac{2\sqrt{3}}{3}\cos A \sin A\right)C$$

for each respective lens.

Based on the above, the optical elements 271a-e described in FIG. 2 can perform the function of cylindrical lenses and they can be oriented and combined in optical elements to accomplish the desired Rx.

While the arrangement of cylinder axes arranged at radial directions of 30°, 90°, and 150° have been described and will function for any three element Rx (e.g., SPH, CYL, Axis), these orientations are not the only solution capable of providing correction for astigmatic non-emmetropic vision. In general, there are many sets of angles that would give sufficient degrees of freedom to match the three parameters of an Rx. For example, three cylinder axes oriented at 0°, 60°, and 120° (e.g., from the horizontal plane of the eye) may also correct for such an Rx. This arrangement maintains the 60° separation between cylinder axes described in FIG. 3B. Though as a further example, three cylinder lenses with cylinder axes separated by 45° (e.g., 0°, 45°, 90°) may also provide the correction necessary for a three element Rx.

In general, the total angular separation between the three cylinder axes of a set of cylindrical lenses can be sufficient to preclude redundancy between two or more of the cylinder lenses. For example, the total angular separation between the three cylinder axes can be in a range from 45° to 180°. The angular displacement of a middle axis of the three cylinder axes can be approximately equal from the other two cylinder axes (e.g., for a total angular separation of 90°, the middle axis can be 45° from the other two) or the cylinder axes can be separated by unequal angles.

In general, rather than refractive cylindrical lenses, IPS mode LC GP lenses capable of providing a variable cylindrical lens are used for the variable focus assemblies depicted in FIG. 2. For the two compound lenses, two and three such GP lenses can be integrated to provide compact, planar optical components that perform as a lens with variable SPH power and a lens with variable, SPH, CYL, and AXIS, respectively.

Figure 4:
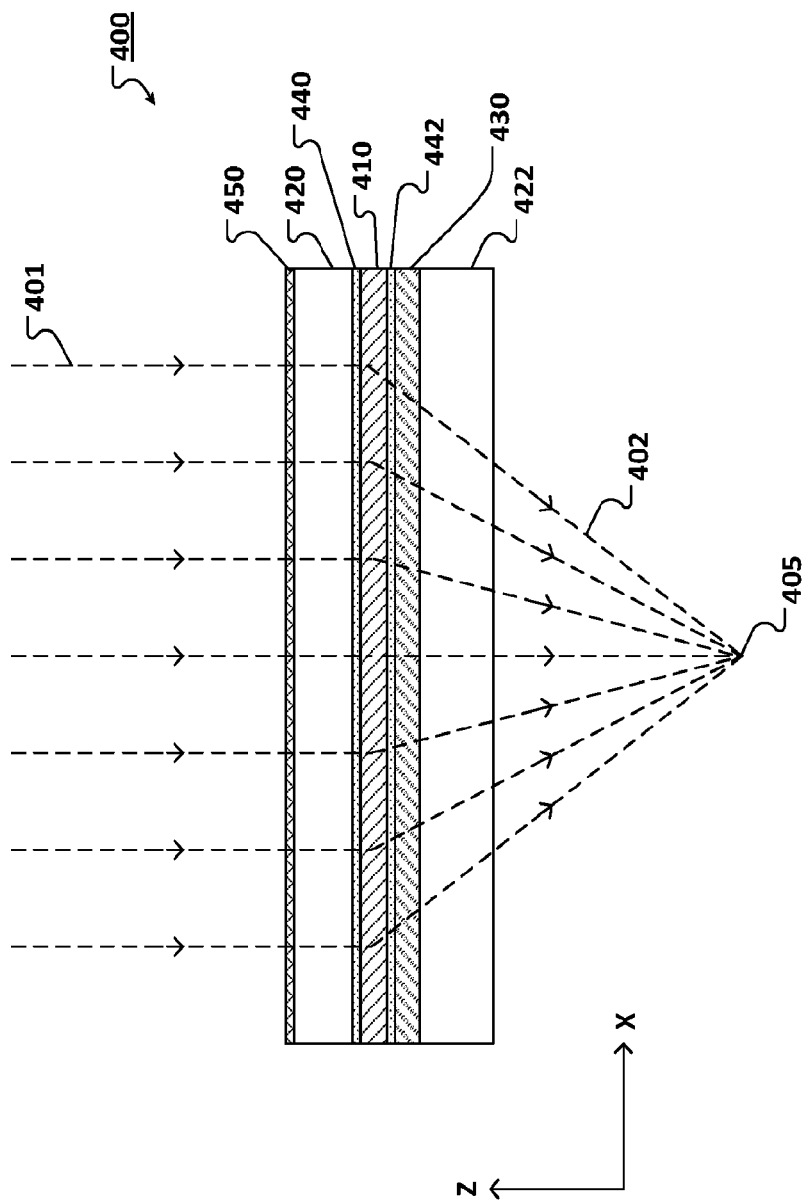
FIG. 4 is a schematic cross-sectional diagram of an example in-plane switching (IPS) mode liquid crystal (LC) cylindrical lens.

Referring to FIG. 4, an example IPS mode LC GP cylindrical lens 400 includes a layer of a liquid crystal material 410 sandwiched between two substrate layers 420 and 422. A Cartesian coordinate system, shown in FIG. 4 and in subsequent figures, is provided for reference. As depicted in FIG. 4, the top surface of lens 400 faces the world side and the bottom surface faces the user side. The bottom substrate layer 422 includes an electrode layer 430 and an alignment layer for 442 adjacent LC layer 410. Top substrate 420 includes an alignment layer 440 on its bottom surface adjacent the top surface of LC layer 410. A polarizer 450 (e.g., a broadband circular polarizer) is applied to the top surface of top substrate 420.

During operation, a plane wave normally incident on the top surface of lens 400, depicted by rays 401, is polarized by polarizer 450 and then focused to a line 405, extending in the y-direction (into the page) by LC layer 410. Thus, the focused light emerges from lens 400 as convergent rays 402. As explained in more detail below, the optical power of the GP lens 400 can be controlled by reorienting the LC material in layer 410, thereby providing a variable cylindrical lens suitable for use in eyepiece 200 described above.

In general, IPS mode LC GP cylindrical lens 400 can be relatively thin. For example, the thickness of the device (i.e., dimension in the z-direction) can be 1 mm or less (e.g., 0.75 mm or less, 0.5 mm or less, 0.25 mm or less). Also, in some embodiments, it is not necessary that each lens in the two compound lenses (e.g., as shown in FIG. 2) have a polarizer layer. For example, in some cases, only the lens closest to the world side in each of the compound lenses has a polarizer layer.

Figures 5A, 5B, 5C:
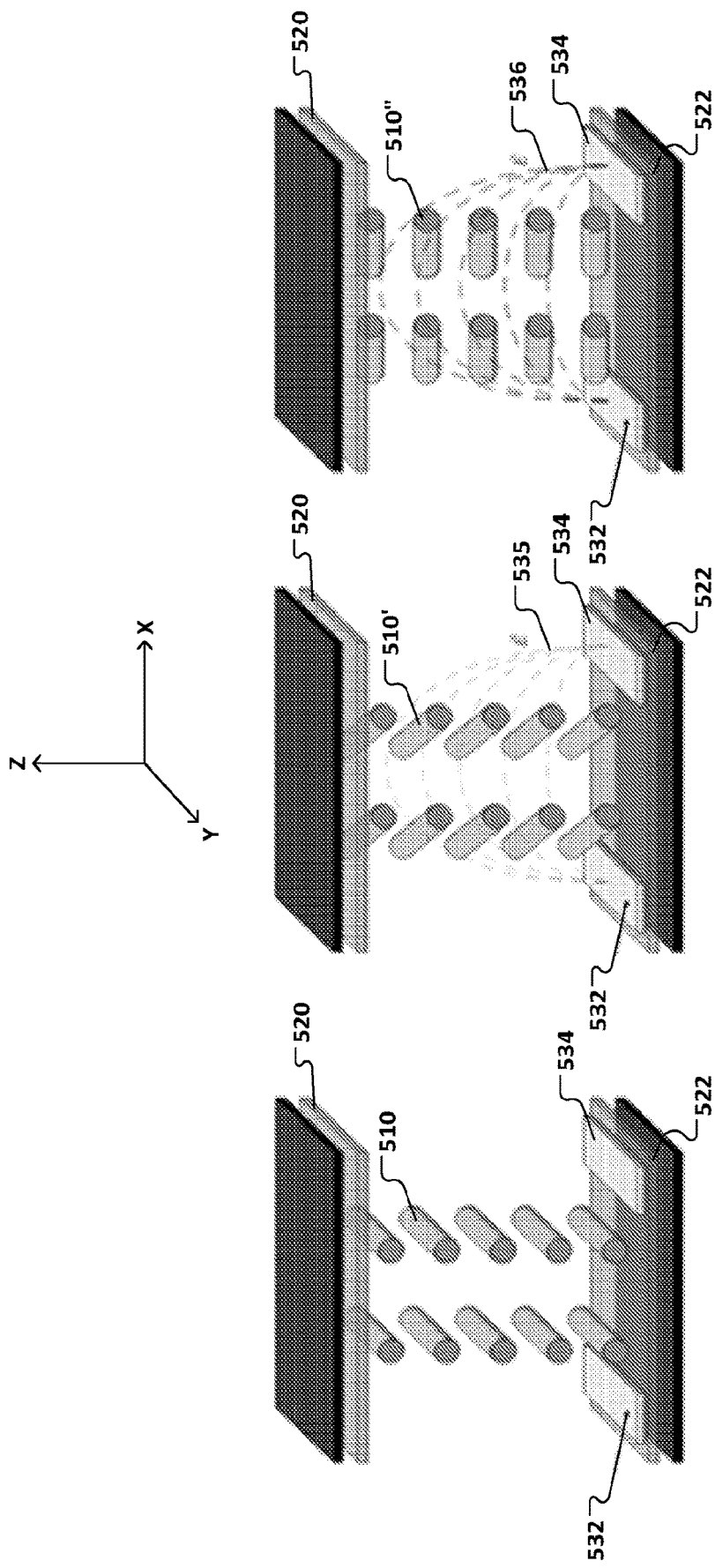
FIGS. 5A-5C are schematic diagrams illustrating different alignment states in an IPS mode LC cell.

Before discussing the LC alignment used for an IPS mode LC GP cylindrical lens, it is instructive to consider the operation of an IPS mode LC cell. FIGS. 5A-5C depict the alignment of liquid crystal molecules in an example IPS LC cell in three different states of alignment. Each of these figures show a portion of an IPS LC cell with an LC layer (510, 510', 510") between a top substrate and a bottom substrate 522. A pair of line electrodes 532 and 534 are provided on the bottom substrate. Electrodes 532 and 534 both extend along the y-direction parallel to each other and when a potential difference is applied across the electrodes, electric field lines extend into the LC layer between the two electrodes where the field lines are approximately parallel to the plane of the LC layer (i.e., parallel to the x-y plane).

Typically, the LC material is a nematic LC material, which refers to a LC mode that has one degree of orientation order but no translational order between molecules. Nematic LCs are typically composed of elongate molecules which, in the absence of an external alignment force, align along a common direction. This is often denoted by a nematic director, which refers to the preferred orientation direction of the molecules. Across an LC cell, the director can be represented by a field, which can vary locally depending on the local electric field and alignment layers, for example.

In FIGS. 5A-5C, the nematic director is depicted by cigar shaped elements, which all align along a common direction between the electrodes. In FIG. 5A, which depicts zero electric field strength in the cell, all the molecules in LC layer 510 align parallel to the y-direction. Generally, the alignment of LC molecules in the zero-field state will be determined by the alignment layers on the substrate surfaces. As depicted, the alignment layers (not shown) align the LC molecules along the y-direction and this alignment is adopted through the entire cell.

FIG. 5B shows alignment in an intermediate field strength. A driver applies a voltage across electrodes 532 and 534, resulting in an electric field depicted by field lines 535 within the LC layer. Here, the LC molecules have a positive dielectric anisotropy, meaning they tend to align with their long axis parallel to the local electric field lines (it is also possible to use LC materials with a negative dielectric anisotropy, in which case the molecules will align perpendicular to the electric field lines). However, viscoelastic forces between the molecules balance the rotational force from the electric field with the preferred alignment at the boundaries imposed by the alignment layers. The result is that the molecules in LC layer 510' realign so that they are aligned non-parallel to the y-axis but non-parallel to the x-direction too, which is the direction of the local electric field lines. For example, the nematic director can be aligned at an angle of 15 degrees or more (e.g., 30 degrees or more, 45 degrees or more, 60 degrees or more, 75 degrees or more) with respect to the y-direction.

Referring to FIG. 5C, at a sufficiently high electric field 536, the LC molecules in LC layer 510" are rotated in the x-y plane sufficiently so that the nematic director is parallel to the electric field lines (i.e., parallel to the x-direction).

Figure 6:
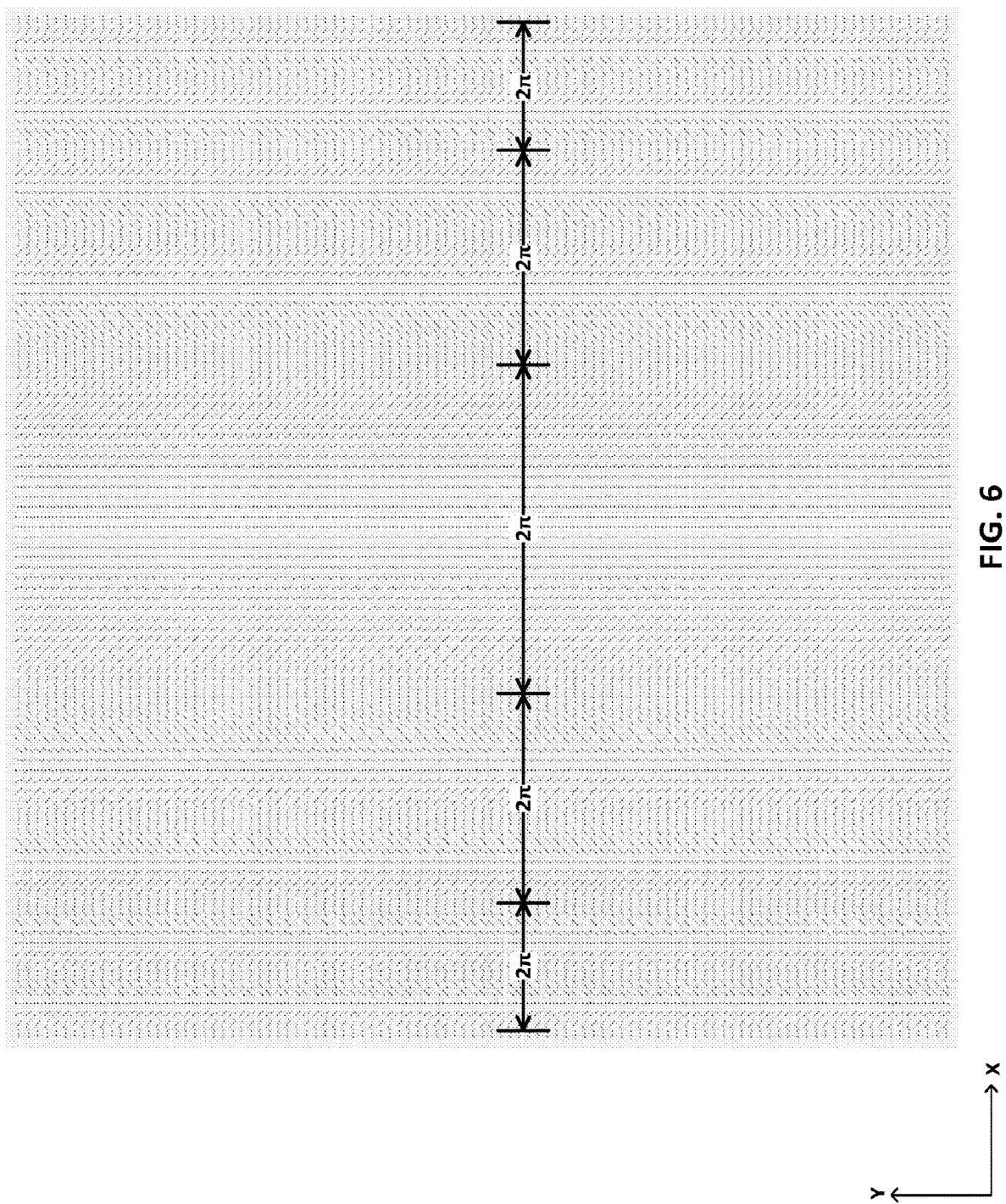
FIG. 6 is a plan view showing an example director field in an IPS mode LC cylindrical lens.

While FIGS. 5A-5C depict just a portion of an IPS cell, the director field of the LC layer can vary across the cell by, for example, varying the electric field strength and/or field line orientation locally across the cell. An example of a director field suitable for a GP cylindrical lens is shown in FIG. 6. Here, the nematic director varies along the x-axis but is constant along the y-direction. This means that polarized light propagating through the LC layer will experience a phase shift that depends on the x-coordinate, but not the y-coordinate. In order to provide a GP that provides focusing for light incident across the aperture defined by the LC cell, the rate of angular change of the director is smallest at the center of the cell (in the x-direction) and increases the closer to the edge of the cell the light is incident. This is evident by looking at the relative distance for the five 2π rotations the director field exhibits across the cell in the x-direction. The (effective) cylindrical axis of the lens is parallel to the y-axis.

In general, the optical power (or, equivalently, focal length) of a GP cylindrical lens depends on the optical anisotropy of the LC material, the thickness of the LC layer, and the director field of the lens. Thus, varying the director field (e.g., varying the spatial wavelength of each $2\pi$ rotation of the director field in the x-direction) can vary the focal length of the GP lens. For instance, for a lens of fixed size, increasing the number of $2\pi$ rotations across the lens's width can increase the cylindrical optical power of the lens. In some embodiments, the LC director field can be driven to have three or more (e.g., five or more, seven or more nine or more, 11 or more) $2\pi$ rotations across the width of the lens in the x-direction. Nematic LC materials generally have a birefringence in a range from 0.05 to 0.25 (e.g., 0.1 or more, 0.15 or more). The thickness of the LC layer can be in a range from 5 μm to 100 μm (e.g., 10 μm or more, 20 μm or more, 30 μm or more, 40 μm or more, 50 μm or more, such as 90 μm or less, 80 μm or less, 70 μm or less, 60 μm or less).

As discussed previously with respect to FIGS. 5A-5C, the local director field in an IPS mode cell can be varied by varying the direction of the field lines and the strength of the electric field. The electric field strength generally depends on the voltage difference applied across adjacent electrodes. The electric field line direction depends on the shape and relative positions of adjacent electrodes. Accordingly, IPS mode LC GP lenses can be provided that allow control of one or more of these parameters to vary the LC director field and, hence, the focal length of each cylindrical lens.

The electrodes are typically formed from a transparent electrically conductive material, such as indium tin oxide (ITO).

In general, a variety of electrode array geometries and drive schemes can be used to generate the LC director field necessary to provide a cylindrical lens with a desired optical power. In some embodiments, a two-dimensional electrode array can be used to provide an electric field that can provide the director field depicted in FIG. 6. For example, FIG. 7A-7E show drive schemes for a two-dimensional electrode array that align an LC material with positive dielectric anisotropy along five different rotations from 0 to $\pi/2$ in the x-y plane. In each case, lines of square electrode pixels are activated to one of two different voltages, V1 and V2, generating electric field lines between alternating lines. Generally, the voltage difference between the adjacent electrodes is selected to provide sufficient electric field strength to orient the LC material between the electrodes to a desired in-plane orientation.

Figure 7:
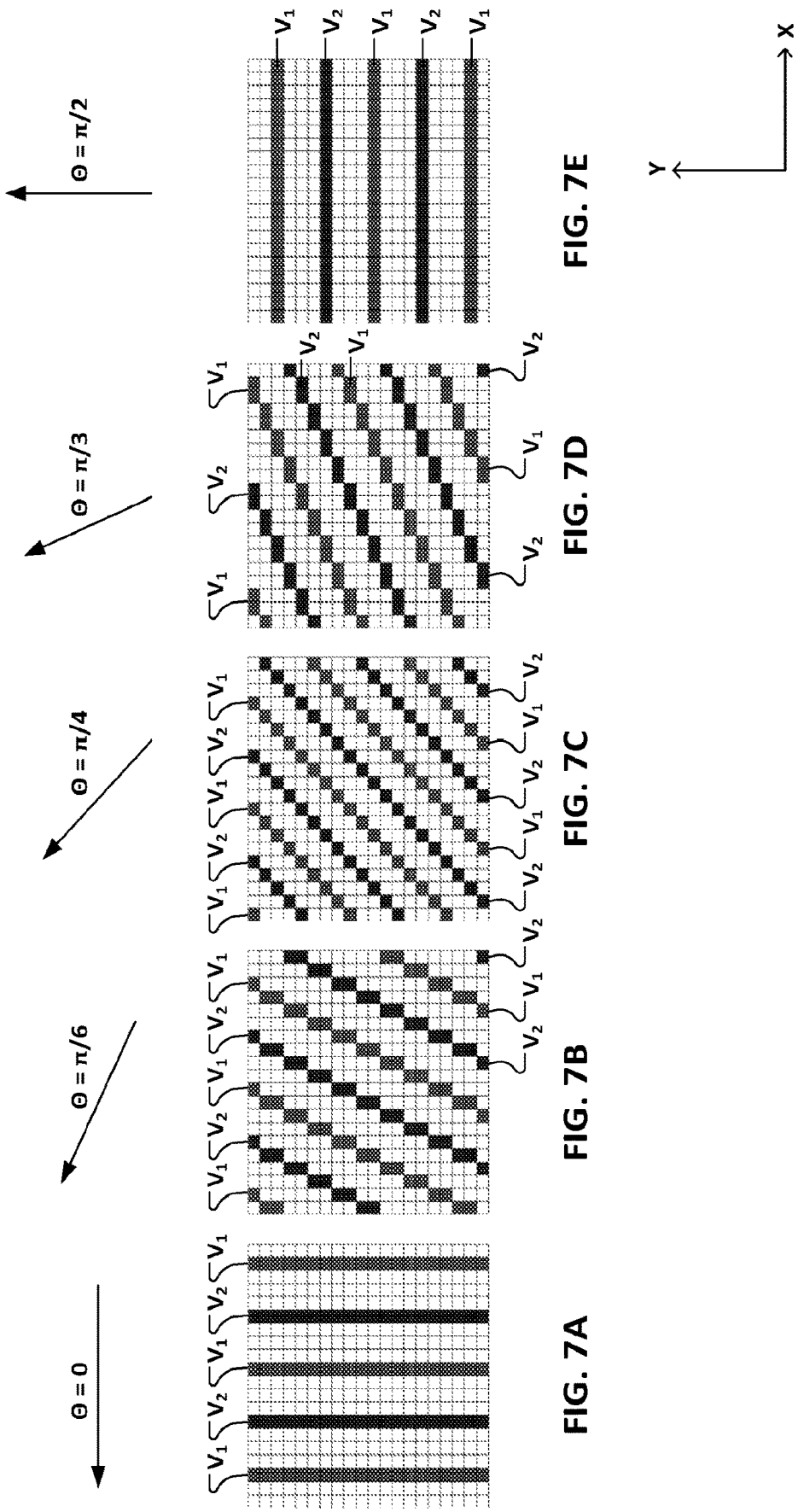
FIGS. 7A-7E are plan views showing example electrode element driving schemes for aligning in-plane LC material in different directions.

As shown in FIG. 7A, lines of pixel electrodes running in the y-direction will generate electric field lines in the x-direction. Alternating lines of pixel electrodes are activated to V1 and V2, with each activated line being separated from the adjacent line by three lines of pixels that are not activated. For an LC material with a positive dielectric anisotropy, the resulting electric field aligns the LC director parallel to the x-axis, with $\theta=0$ as shown in FIG. 7A.

FIG. 7E shows lines of activated pixel electrodes running in the x-direction generate electric field lines in the y-direction. The alternating lines are also separated by three lines of pixels that are not activated. For LC material with a positive dielectric anisotropy, the resulting electric field aligns the LC director parallel to the y-axis, with $\theta=\pi/2$. FIGS. 7B-7D show diagonal lines of activated pixel electrodes which align the LC material at angles $\theta=\pi/6$, $\pi/4$, and $\pi/3$ respectively.

In some embodiments, a time-varying drive scheme can be used. Driving electrode pixels over time periods shorter than a relaxation time of the LC material can allow overlapping areas of pixel electrodes to be used to generate electric field lines in different directions. It is believed that by switching quickly between different fields it is possible to generate director fields such as those shown in FIG. 6 while reducing out-of-plane orientations of LC molecules associated with fringe fields close to the activated electrodes.

Figure 8:
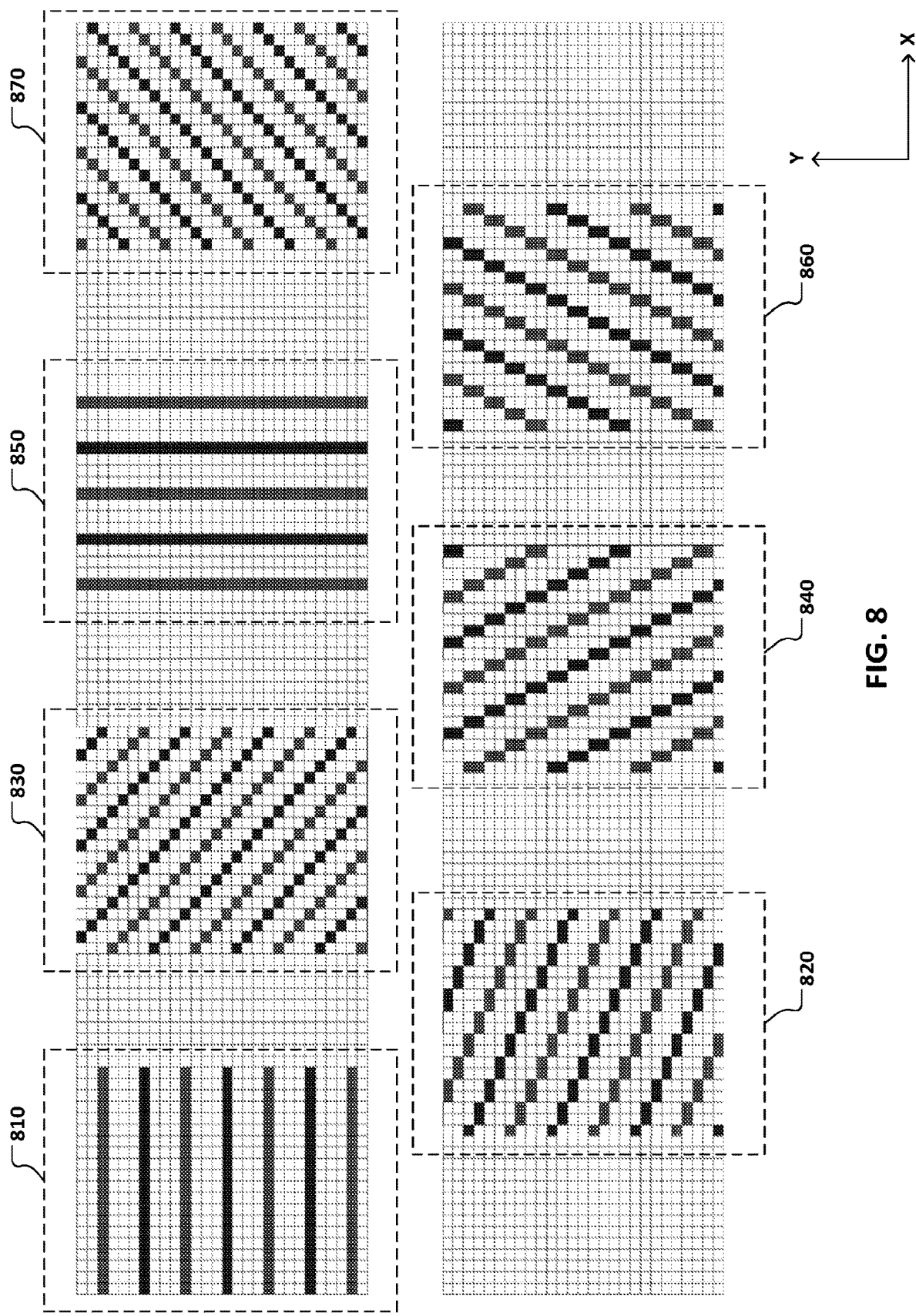
FIG. 8 is a plan view of sequential example electrode element driving schemes for aligning in-plane LC material in different directions.
Figure 9B:
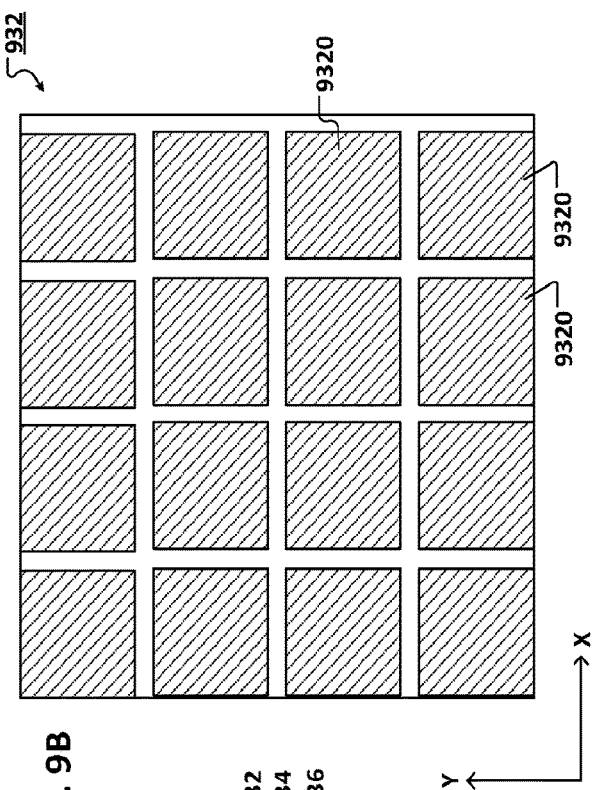
FIGS. 9B-9D are plan view diagrams showing electrode geometries for different electrode layers in of the multi-layer electrode array shown in FIG. 9A.
Figure 9C:
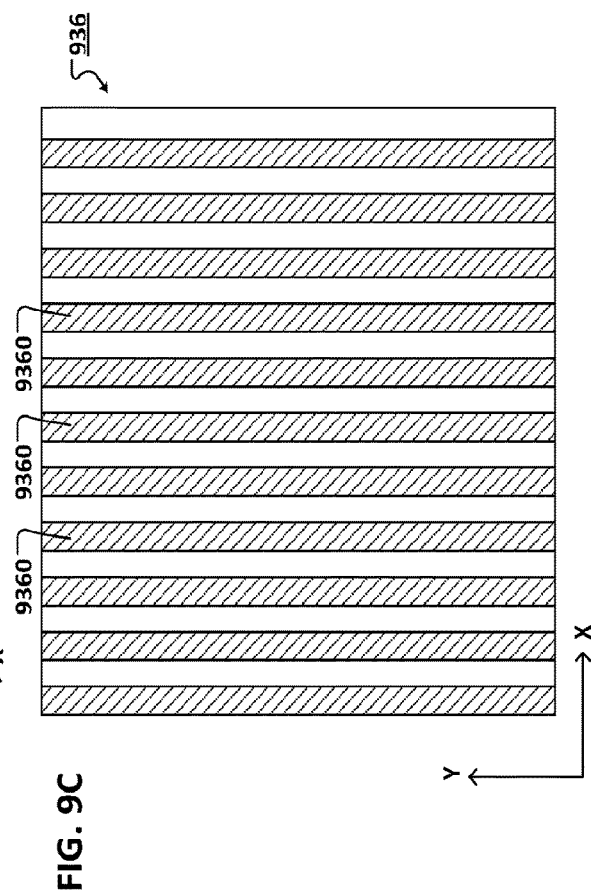
Figure 9A:
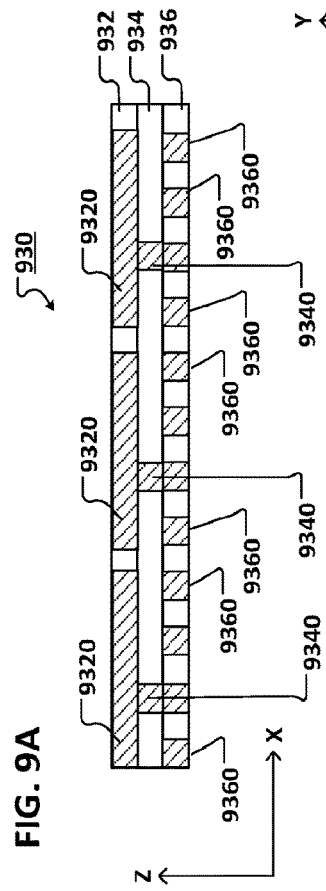
FIG. 9A is a schematic cross-sectional diagram of an example multi-layer electrode array for an IPS LC cylindrical lens.
Figure 9D:
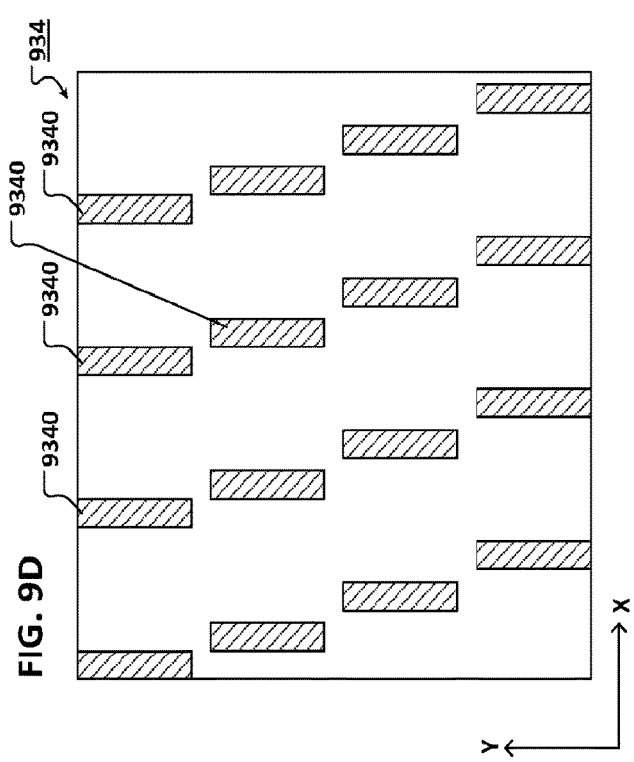

An example time-varying drive scheme is shown in FIG. 8. An area of a pixel electrode array of square pixel electrodes is shown at two different times, t=1 and t=2. At the first time, t=1, four distinct areas 810, 830, 850, and 870 are activated to generate four respectively different electric field orientations. Each area is separated by an area of electrode elements that are not activated at this time. Later, t=2, three areas, 820, 840, and 860 are activated. Area 820 overlaps with areas 810 and 830. Similarly, area 840 overlaps with areas 830 and 850, and area 860 overlaps with areas 850 and 870. The lines of pixel electrodes activated in areas 810, 830, 850, and 870 are at 0°, −45°, 90°, and +45° with respect to the x-axis, respectively. The lines in areas 820, 840, and 860 are at approximately −22.5°, −67.5°, and +67.5° respectively. In other words, the electric field lines generated from area-to-area result in a continuous rotation of the LC director across the total pixel area.

As noted previously, the period of alternating from t=1 to t=2 is less (e.g., substantially less) than a relaxation time of the LC material. For example, the switching period can be 20% or less (e.g., 10% or less, 5% or less, 2% or less, 1% or less, 0.5% or less, 0.1% or less) of the relaxation time of the LC layer. In some embodiments, the switching period can be 20 ms or less (e.g., 10 ms or less, 5 ms or less, 2 ms or less, 1 ms or less). Here, the switching period refers to the cycle time from t=1 to t=2, and back to t=1 (i.e., the time for a full cycle). During operation, the pixel electrode array can be continuous switched back and forth between these two states, providing a desired constant director field that provides the desired cylindrical lens effect.

While the example described in relation to FIG. 8 features two distinct electrode activation states, more generally electrodes can be switched between more than two states during operation (e.g., three or more, four or more).

Referring to FIGS. 9A-9D, a multilayer electrode structure can be used to facilitate driving a pixel array. Here, an example multi-layer electrode structure 930 includes a top layer 932 having an array of square pixel electrodes 9320, a via layer 934 composed of transparent rectangular vias 9340, and a bottom electrode layer 936 composed of vertical (i.e., aligned in the y-direction) conducting lines 9360. The regions between the pixel electrodes, vias, and conducting lines are formed from an electrically insulating material (e.g., a dielectric). Vias 9340 electrically connect pixel electrodes 9320 with one of the conducting lines 9360. For the geometry shown, each conducting line 9340 connects to every fourth overlying pixel electrode 9320. Thus, driving a voltage to any one conducting line 9360 will drive every fourth pixel electrode in a single column of pixels. By way of illustration, the arrangement shown in FIGS. 9A-9D can be used to drive the pixel electrode array in horizontal lines, vertical lines, and along certain diagonal lines depending on which conducting lines 9360 are activated.

When overlaid on each other, the rows of electrodes in the middle and bottom electrode layers register with each other and the rectangular electrodes of middle electrode layer 934 are spaced so that each electrode is adjacent a corresponding square electrode in bottom electrode layer 936. For example, driving every fourth line will activate a row of pixel electrodes. Activating four consecutive lines will activate a vertical column of pixel electrodes. Activating every fifth line will activate a diagonal line of pixel electrodes. Generally, this concept can be expanded to geometries with higher resolution. For example, arrangements capable of addressing every 8, 12, 16, 24 or higher number of pixels is possible.

While the foregoing electrode geometries are provided as examples, in general, any electrode geometry capable of providing the desired in-plane electric field for generating an in-plane director field for a GP cylindrical lens can be used. Generally, the size and number of pixel electrodes in the array is selected to provide a resolution suitable for the application. The examples presented above are for purposes of presenting the electrode geometries and switching schemes and typically the number of pixel electrodes in the array will be significantly higher than what is depicted. For example, in some embodiments, the lens will have an active aperture of 1 cm² or more (e.g., 5 cm² or more, 10 cm² or more, 16 cm² or more) and the pixel electrodes can have dimensions on the order of 100 µm or less (e.g., 50 µm or less, 25 µm or less, 10 µm or less, 5 µm or less). In other words, the electrode arrays can include hundreds, thousands, or tens of thousands of pixel electrodes.

As noted above, in general, the cylindrical refractive power of each lens depends on the director field, the thickness of the LC layer, and the birefringence of the LC material. The cylindrical refractive power can be variable through a range from −5 D to +5 D (e.g., −4 D, −3 D, −2 D, −1 D, 0 D, 1 D, 2 D, 3 D, or 4 D). The cylindrical refractive power can be varied in incremental steps of 0.1 D or more (e.g., 0.2 D or more, such as 0.25 D or 0.5 D) from −5 D to +5D, for example.

What is claimed is:

1. An optical system, comprising:
   a first in-plane switching (IPS) mode liquid crystal (LC) element arranged along an optical axis;
   a second IPS mode LC element arranged along the optical axis;
   a third IPS mode LC element arranged along the optical axis; and
   an electronic controller in communication with the first, second, and third IPS mode LC elements, the electronic controller being configured, during operation, to provide drive signals to the first, second, and third IPS mode LC elements, respectively, so that the first, second, and third IPS mode LC elements collectively form an optical element having an overall non-zero spherical refractive power (SPH), non-zero cylinder refractive power (CYL), and cylinder axis (Axis) according to a prescription (Rx),
   wherein each of the IPS mode LC elements comprises a respective layer of a LC material between two substrates,
   each of the IPS mode LC elements comprises a respective electrode layer supported by one of the two substrates, and
   each electrode layer comprises a respective two-dimensional array of pixel electrodes, wherein each two-dimensional array of pixel electrodes comprises a plurality of rows of pixel electrodes and a plurality of columns of pixel electrodes,
   wherein each pixel electrode comprises a respective plurality of conducting lines, and the pluralities of conducting lines across the two-dimensional array of pixel electrodes are oriented in a same direction.

2. The system of claim 1, wherein each of the IPS mode LC elements is a respective geometric phase (GP) cylindrical lens during operation of the system.

3. The system of claim 2, wherein each respective GP cylindrical lens has a cylinder axis aligned in a different direction.

4. The system of claim 1, wherein the LC material is a nematic phase LC material.

5. The system of claim 1, wherein the electronic controller is programmed to drive each array of pixel electrodes to uniformly align the LC material along a first direction in a plane of the respective IPS mode LC element and to vary an alignment of the LC material along a second direction in the plane orthogonal to the first direction.

6. The system of claim 5, wherein the alignment of the LC material along the second direction comprises a plurality of 2π rotations of a nematic director of the LC material.

7. The system of claim 6, wherein a spatial wavelength of the 2π rotations varies across the IPS mode LC element in the second direction.

8. The system of claim 7, wherein the spatial wavelength of the 2π rotations in the second direction increases from a center of the IPS mode LC element towards edges of the IPS mode LC element.

9. The system of claim 5, wherein the electronic controller is programmed to drive different subsets of the pixel electrodes at different times and to switch back and forth between the different subsets with a cycle shorter than a relaxation time of the LC material.

10. The system of claim 1, wherein the first IPS mode LC element is configured with a first cylinder axis arranged at a first radial direction, the second IPS mode LC element is configured with a second cylinder axis arranged at a second radial direction, and the third IPS mode LC element is configured with a third cylinder axis arranged at a third radial direction, and wherein an angular separation between the first and second radial directions is equal to an angular separation between the second and third radial directions.

11. The system of claim 10, wherein, for a Cartesian coordinate system orthogonal to the optical axis, the first radial direction is at 30°, the second radial direction is at 90°, and the third radial direction is at 150°.

12. The system of claim 11, wherein a first cylindrical corrective refractive power, $C_{30}$, of the first IPS mode LC element, a second cylindrical corrective refractive power, $G_{90}$, of the second IPS mode LC element, and a third cylindrical corrective refractive power, $C_{150}$, of the third IPS mode LC element, and values for spherical lens refractive power(S), cylindrical lens refractive power (C), and cylindrical lens angular orientation (A) are related according to the formulae:

$$C_{30} = \frac{2}{3}S + \left(\frac{2}{3}\cos^2 A + \frac{2\sqrt{3}}{3}\cos A \sin A\right)C$$

$$C_{90} = \frac{2}{3}S + \left(\sin^2 A - \frac{1}{3}\cos^2 A\right)C$$

$$C_{150} = \frac{2}{3}S + \left(\frac{2}{3}\cos^2 A - \frac{2\sqrt{3}}{3}\cos A \sin A\right)C.$$

13. The system of claim 1, wherein a cylindrical refractive power of each of the first, second, and third IPS mode LC elements is variable through a range from −5 D to +5 D.

14. The system of claim 1, wherein the optical element has an aperture having an area of at least 1 cm², 5 cm², 10 cm², or 16 cm².

15. The system of claim 1, wherein each of the first, second, and third IPS mode LC elements exhibits a thickness along the optical axis of at most 10 mm, 6 mm, 4 mm, 3 mm, 2 mm, or 1 mm.

16. A head-mountable display, comprising:
a first optical element having a variable spherical refractive power (SPH);
a second optical element having
a variable SPH, a variable cylinder refractive power (CYL), and
a variable cylinder axis (Axis), the second optical element comprising at least one in-plane switching (IPS) mode liquid crystal (LC) element,
wherein each IPS mode LC element comprises a respective layer of a LC material between two substrates,
each IPS mode LC element comprises a respective electrode layer supported by one of the two substrates,
each electrode layer comprises a respective two-dimensional array of pixel electrodes, wherein each two-dimensional array of pixel electrodes comprises a plurality of rows of pixel electrodes and a plurality of columns of pixel electrodes,
wherein the first optical element comprises two variable cylindrical lenses having their respective cylinder axes orthogonal to each other;
a see-through display arranged between the first optical element and the second optical element; and
an electronic controller in communication with the first optical element, the second optical element, and the see-through display, the electronic controller being programmed to adjust the SPH of the first optical element and the SPH, CYL, and Axis of the second optical element according to a prescription (Rx) of an individual user of the head-mounted display,
wherein each pixel electrode comprises a respective plurality of conducting lines, and the pluralities of conducting lines across the two-dimensional array of pixel electrodes are oriented in a same direction.

17. The head-mountable display of claim 16, further comprising a frame to which the first optical element, the second optical element, and the see-through display are mounted.

18. The head-mountable display of claim 17, wherein the second optical element is arranged between the see-through display and the user during use of the head-mountable display.

19. The head-mountable display of claim 16, wherein the second optical element comprises three IPS mode LC elements arranged such that their respective cylinder axes are in different radial directions.

20. The head-mountable display of claim 16, further comprising an eye-tracking module, the electronic controller being programmed to vary the prescription of the second optical element based on information, received from the eye-tracking module, describing where the user of the head-mountable display is looking.

21. The head-mountable display of claim 20, wherein the electronic controller is programmed to vary the SPH, CYL, and Axis of the second optical element from a near-vision prescription to a distance-vision prescription depending on where the user is looking.

22. The head-mountable display of claim 16, further comprising a biometric identification module, the electronic controller being programmed to identify the user based on information from the biometric identification module and adjust a prescription of the second optical element based at least partly on the identity of the user.

23. The head-mountable display of claim 22, wherein the biometric identification module is an iris identification module.

* * * * *